United States Patent [19]

Tarbutton et al.

[11] 4,328,274
[45] May 4, 1982

[54] TRANSPARENT FRICTION SURFACE SHEET MATERIAL

[75] Inventors: Kent S. Tarbutton, Lake Elmo; Ronald O. Zemke, White Bear Lake, both of Minn.

[73] Assignee: Minnesota Mining and Manufacturing Company, St. Paul, Minn.

[21] Appl. No.: 65,609

[22] Filed: Aug. 10, 1979

[51] Int. Cl.³ .............................................. B32B 5/16
[52] U.S. Cl. .................................. 428/149; 428/142; 428/145; 428/147; 428/203; 428/206; 428/210; 428/325; 428/354
[58] Field of Search ............... 428/325, 40, 145, 147, 428/149, 142, 203, 206, 210, 354; 36/59 R, 62, 59 C; 280/11.37 R, 11.37 E

[56] References Cited

U.S. PATENT DOCUMENTS

| | | | |
|---|---|---|---|
| Re. 25,778 | 5/1965 | Bore et al. ............................ | 428/40 |
| 2,567,233 | 9/1951 | Palmquist et al. ................... | 428/325 |
| 2,732,065 | 1/1956 | Marchese ............................. | 36/59 R |
| 3,227,604 | 1/1966 | Morgan ................................. | 428/40 |
| 3,578,550 | 5/1971 | Hoerner et al. ...................... | 428/40 |
| 3,676,208 | 7/1972 | Griffin ................................... | 428/325 |
| 3,935,365 | 1/1976 | Eigenmann .......................... | 428/325 |
| 4,020,211 | 4/1977 | Eigenmann .......................... | 428/325 |
| 4,146,635 | 3/1979 | Eigenmann .......................... | 428/325 |

Primary Examiner—Marion McCamish
Attorney, Agent, or Firm—Cruzan Alexander; Donald M. Sell; Richard Francis

[57] ABSTRACT

A friction surface sheet material which may be adherently bonded to the patterned surface of a substrate which permits the visual observation of such pattern when attached. The friction surface sheet material comprises a backing layer formed of a dimensionally stable polymeric film such as polyethylene terephthalate. A first and second coating of the first and second transparent binder material adherently bond a multitude of minute transparent glass particles uniformly dispersed over the upper major surface of the backing layer, with the tops of the glass particles projecting above the binder coating to provide a friction surface, and the bottom major surface of the backing layer has thereon a layer of transparent pressure-sensitive adhesive. The glass particles may be glass spheres or fragments obtained by fracturing larger particles of glass. The transparent sheet material of the invention is particularly suited for applying to the surface of skate boards, particularly those which have ornamental surfaces which the owners desire not to obscure.

13 Claims, 2 Drawing Figures

TRANSPARENT FRICTION SURFACE SHEET MATERIAL

BACKGROUND OF THE INVENTION

1. Field of the Invention

The present invention relates to a transparent friction surface sheet material formed by bonding transparent glass particles with a transparent binder material to the surface of a transparent backing layer which has transparent pressure-sensitive adhesive on the opposite surface.

2. Prior Art

Skate boarding is a pastime which is rapidly gaining popularity both in the United States and in many foreign countries. The skate board has evolved from a very simple device comprising roller skate wheels fastened to a board to exotic and aesthetically pleasing vehicles designed by engineers and decorated by artists or skilled designers to provide engineering and artistic marvels, many times costing several hundred dollars each or more. In fact, even the casual skate boarder has a sizable investment in his vehicle which is frequently exotically ornamented by the manufacturer at least on its upper surface which is intended to bear the feet of the user.

It is generally recognized by most skate boarders that it is desirable to have a frictional top or foot-bearing surface of the skate board to facilitate maneuvering and prevent slipping. Many commercially available friction surface sheet materials have been employed for this purpose. A particular useful sheet material is that manufactured and sold by the assignee of the present patent application under the trade designation "Safety-Walk". While such a friction surface sheet material provides an adequate degree of frictional resistance, it is only available in embodiments which obscure any decoration or art work which may be present on the surface to which it is applied. The present invention provides a friction surface sheet material which provides superior frictional resistance yet permits visual observation therethrough with little or no obscuring of any surface decoration on the skate board.

SUMMARY OF THE PRESENT INVENTION

The present invention is a friction surface sheet material which is capable of being adhesively attached to the surface of a substrate such as the foot-bearing surface of a skate board which may contain thereon a surface decoration without significantly obscuring the decoration, when attached.

The friction surface sheet material of the present invention comprises a transparent backing layer formed of a dimensionally stable, biaxially oriented, transparent polymeric film having an upper and a lower major surface. A first coating of a first tough transparent binder material having an elongation of at least 40% and a tensile strength of at least 1000 psi is adherently bonded to the upper major surface. A second coating of a second tough, transparent binder material useful for pedestrian traffic and having an elongation of at least 40% and a tensile strength of at least 1000 psi is adherently bonded to the surface of the first coating of the first transparent binder material. A multitude of minute glass particles no larger than 10 Tyler mesh and capable of withstanding pedestrian traffic without significant fracture are uniformly distributed over the upper major surface and adherently bonded thereto by the first and the second transparent binder materials with the tops of the glass particles projecting above the exposed surface of the second coating to provide a friction surface. The combined thickness of the binder materials is sufficient to adherently bond the glass particles to substantially resist particle loss under pedestrian use. The lower major surface of the backing layer contains a layer of transparent pressure-sensitive adhesive material to facilitate attachment of the friction surface sheet material to a substrate surface.

While the friction surface sheet material has been suggested for use on skate boards, it is intended for use on any other substrate to which it may be applied, whether or not the transparency feature would be a benefit. Examples of use situations where the transparency would be a benefit where the friction surface of the present invention may be used include painted surfaces where the user does not want to obscure the painted surface being coated, for example on the top portion of a fender of a boat trailer, where that portion is used to step onto the trailer, on diving boards, surf boards, and the like.

While the friction surface sheet material of the present invention may from time to time herein be referred to as being "transparent", it is not transparent in the sense of a clear, transparent piece of glass. Rather, the friction surface sheet material of the present invention is substantially transparent once it is applied to a substrate. Visual observation through an unattached segment of the friction surface sheet material of the present invention would reveal light, but no clear images, such as one would observe through a clear transparent piece of glass. Even when applied, there will be some minor distortion of the image being covered, as may be expected, particularly when larger glass particles are employed, although a covered pattern would be substantially visible through the sheet, once attached. It should be noted that the backing layer may be imprinted with a design or other indicia. In that case, the imprinted portion of the backing layer would be visible before attaching the friction surface sheet and, upon attaching, the imprinted portion could obscure the substrate surface, if a non-transparent imprinting ink is used.

DRAWING

The invention may be further understood by reference to the drawing, wherein

FIG. 1 is an enlarged cross-sectional view of a segment of the friction surface sheet material of the present invention; and FIG. 2 is a perspective view of a skate board having a piece of the friction surface sheet material of the present invention partially attached to its foot-bearing surface, with one end being unattached to give a better impression of its transparency.

DESCRIPTION OF THE PREFERRED EMBODIMENTS

Figure 1:
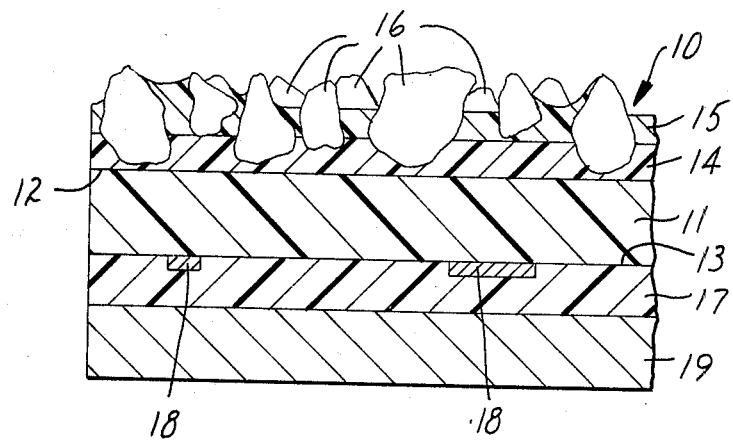
Figure 2:
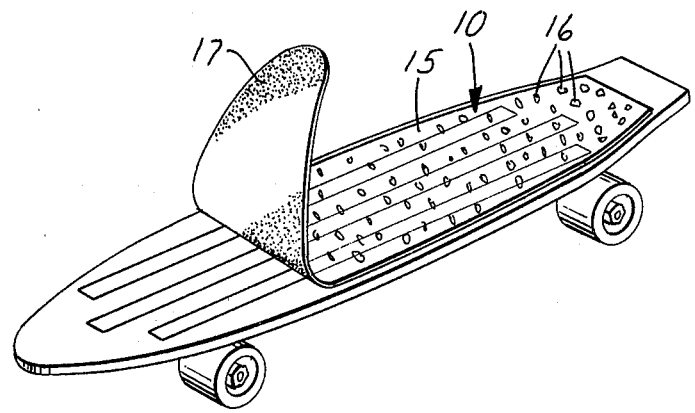

Referring now to FIG. 1, there is shown a friction surface sheet material 10 having a dimensionally stable transparent backing layer 11 having an upper major surface 12 and a lower major surface 13. A first layer 14 of a first tough transparent binder material having an elongation of at least 40% and a tensile strength of at least 1000 psi is adherently bonded to upper surface 12. A second layer 15 of a second tough transparent binder material useful for pedestrian traffic overcoats first layer 14. (First binder layer 14 and second binder layer 15 are hereinafter referred to respectively as the "make" coating and the "size" coating as is conventional in the coated abrasive art as well as by the terms previously used.) A multitude of minute transparent glass particles 16 no larger than 10 Tyler mesh and capable of withstanding pedestrian traffic without significant fracture are uniformly distributed over upper major surface 12 of backing layer 11 and firmly adherently bonded thereto by the transparent make coating 14 and the transparent size coating 15 so that the tops of glass particles 16 project above the general plane of the exposed surface of the size coating to provide a friction surface. It should be noted that the size coating may cover some of the projecting parts of glass particles 16, since the size coating is applied over the glass particles in making the sheet material of the invention. In that case, the top ends of the glass particles will project above the plane of the top surface of the size coating with a layer of size coating of varying thickness covering the top ends to provide a protuberance consisting of a size coated glass particle. In use, the size coating may wear away to expose the projecting top end of the glass particle. The combined thickness of the make and size coatings 14 and 15 is sufficient to adherently bond particles 16 thereto and to substantially resist particle loss under pedestrian use.

A layer 17 of transparent pressure-sensitive adhesive material is on the lower major surface 13 of transparent backing layer 11 to facilitate attachment of the friction surface sheet material to a substrate surface. Optionally, either bottom surface 13 or top surface 12 of backing layer 11 may be imprinted to provide a decorative design, message or other indicia to provide additional decoration or to provide decoration to a substrate which has none to begin with. Such imprinting is identified by reference numeral 18. Preferably, adhesive layer 17 is protected by an appropriate release liner 19 which may be formed of any sheet material known for this purpose such as silicone coated kraft paper, and the like.

The transparent backing layer is formed of a dimensionally stable, biaxially oriented, preferably heat-set, transparent polymeric film which is selected to or treated to have relatively good adhesion to the make coating binder material and the pressure-sensitive adhesive material. The backing layer thickness preferably is on the order of 50 to 80 microns, most preferably 50 to 75 microns. For complex substrate surfaces backing layers having a thickness on the order of 50 to 60 microns may be desired to obtain maximum conformability. The backing layer need not have an extremely high degree of strength, although such strength is preferred. The backing layer should, however, have sufficient strength to permit processing, i.e., coating and handling, and installation upon a substrate and, if desired, removal from such substrate. Preferred materials useful in providing the backing layers include biaxially oriented films such as those formed of polyethylene terephthalate and polypropylene. Other similar plastic films may also be useful.

Biaxially oriented polyethylene terephthalate film is known for its high strength, chemical resistance and relatively non-adherent surface. It is therefore desirable to prime or otherwise treat the surface of the biaxially oriented polyethylene terephthalate film to make it adequately adherent. Many known surface treatments may be used for this purpose. The preferred surface treatment for the upper surface is a surface preparation disclosed in assignee's Krogh and Brink Patent (U.S. Pat. No. 3,607,354) which employs certain halogenated phenols such as chlorophenol to treat the surface and make it more adherent. Additionally, certain priming compositions may also be utilized. When utilizing acrylate pressure-sensitive adhesive compositions as the pressure-sensitive adhesive composition, a preferred surface treatment for biaxially oriented heat-set polyethylene terephthalate is provided by an aminized polybutadiene priming composition such as that disclosed in U.S. Pat. Nos. 3,661,874; 3,740,414; and 3,843,397.

The make and size coatings may be formed of the same binder material or they may be two different binding materials. The binder materials providing the make and size coatings have an elongation of at least 40%, preferably 100%, and a tensile strength of at least 1000 psi, preferably 1500 psi. At elongation values lower than 40%, some undesirable loss of glass particles may be noted due to binder failure. Additionally, binders having a low elongation may crack, delaminate and otherwise fail. A quick test to determine whether or not a binder material is useful may be done by creasing a coated backing on itself and observing the binder layer. If the binder layer cracks or delaminates under such creasing, it will not generally be suitable, particularly where the substrate has surface deformations, although it may be useful in moderate use situations on a planar substrate surface. At tensile strength values less than 1000 psi, the glass particles will be lost somewhat faster and binders having such tensile strength values are therefore undesirable.

The coating weight of the make and size coatings will vary depending upon the size of the glass particles, more binder being permitted with larger particles. The binder coating should not be so thick as to obscure the particles and thereby deminish or eliminate friction surface. The binder layer should be of a sufficient thickness to adherently bond the particles without interfering with the frictional properties of the surface of the sheet.

Typical binder coating weights will be on the order of 85 to 125 grams per square meter for the make coat and 65 to 145 grams per square meter for the size coat.

The glass particles may be transparent regular or irregularly shaped glass particles. The glass particles may be small minute spheres or irregularly shaped fractured glass particles having relatively sharp edges and peaks. The glass particle size range will vary, depending upon the particular use. For skate boards, where it is common to stand on the skate board with bare feet, a particle size which passes through 20 Tyler mesh and is retained on 28 Tyler mesh is preferred. For other pedestrian surfaces where the user could be expected to wear shoes, a particle size which passes through 10 Tyler mesh and is retained on 35 Tyler mesh is preferred. The particle size may vary between 10 and 115 Tyler mesh. Particles larger than 10 Tyler mesh are not desired because they are unduly coarse. Particles smaller than 115 Tyler mesh do not generally provide an adequate degree of friction.

The pressure-sensitive adhesive is a transparent conventional pressure-sensitive adhesive which preferably is selected to have a relatively high degree of cohesive strength to prevent splitting, if the friction surface sheet material is to be removed from the substrate. A useful pressure-sensitive adhesive material is the acrylic type adhesive described in Example 7 of assignee's Ulrich Patent (Patent No. Re. 24,906). Other transparent pressure-sensitive adhesives are also useful, e.g., synthetic rubber:resin type adhesives.

The friction surface sheet material may be prepared by coating the backing layer or backing sheet, after surface treatment if necessary as described above, with a liquid binder material to provide a make coating which will initially adhere the glass particles to the surface of the backing film. The size coating is then applied to firmly adherently bond the glass particles to the backing sheet. Thereafter, the pressure-sensitive adhesive layer may be applied.

The binder material may be applied by any convenient film coating technique. A preferred coating technique involves roll coating, but extrusion coating or curtain coating may also be employed. Roll coating involves applying a solvent solution or dispersion of the binder material onto the surface of the film by use of a roller. Extrusion coating involves casting a liquid binder material on the surface of the backing.

The glass particles may be applied to the make coating by any of a number of known methods such as the methods known in the abrasive making art. The preferred method of coating the glass particles on the backing layer is by drop coating wherein the glass particles are uniformly distributed and permitted to fall through the air onto the freshly coated surface of the backing. Thereafter, the make coating may be first cured or the size coating may be applied immediately and both coatings cured simultaneously.

EXAMPLES

The invention is further illustrated by the following examples, wherein all parts are by weight unless otherwise specified.

EXAMPLE 1

A 51 microns biaxially oriented heat-set transparent polyethylene terephthalate film was primed on one side by coating with a 15% solution of para chlorophenol in a mixture of 80% (by weight) toluene and 20% (by weight) methylethyl ketone and drying at 80° C. The primed surface was coated with an 82.5% nonvolatile make coating composition (described below) to provide a dry coating weight of 100 grams per square meter by roll coating.

| Make Coating Composition | |
|---|---|
| Ingredients | Parts by Weight |
| Polyisocyanate - a 75% solution of the reaction product of 3 mols of toluene diisocyanate and 1 mol of trimethylol propane in ethyl acetate available under the trade designation "Mondur" CB 75 from the Mobay Chemical Company | 41.6 |
| Hydroxyl terminated polyester having an OH number of 49.4 available under the trade designation "Desmophene" 1770 from the Mobay Chemical Company | 49.1 |
| Glycerol | 1.1 |
| Trimethylol propane | 1.1 |
| Ethyl glycol acetate available under the trade designation "Cellosolve" acetate | 7.1 |

Glass particles, which pass through a 20 Tyler mesh screen and were held on a 28 Tyler mesh screen, were drop coated at 250 grams per square meter and the make adhesive was cured in a hot air oven for 30 minutes at 105° C. The glass particles were crushed glass particles having the following composition:

| Components | Parts by Weight |
|---|---|
| Silica | 60-80 |
| Calcium carbonate | 15-16 |
| Calcium oxide | 5-25 |
| Alkali (NaOH, KOH, LiOH) | 5-16 |
| Boron oxide | 10-20 |

Using the same adhesive composition as described above (i.e., the make coating composition), the glass particle coated-backing surface was size coated at the rate of 120 grams dry weight per square meter and the coated web was cured in a hot air oven for 4 hours at 105° C.

The backing film was primed after size coating on its lower surface with an aminized polybutadiene priming composition described in assignee's U.S. Pat. Nos. 3,661,874, 3,740,414 and 3,843,397. The primed surface was then coated with a pressure-sensitive adhesive composition consisting of 90 mol percent iso-octylacrylate and 10 mol percent acrylic acid described in the aforementioned Pat. No. Re. 24,906, by precoating a thin layer (125 g/m$^2$) of the adhesive on a paper release liner, was then laminated to the prime lower surface of the backing film.

Prior to applying the pressure-sensitive adhesive, the coated backing was creased to determine whether or not the binder materials were satisfactory. In this test, the particle coated film is folded upon itself, keeping the coated particles exposed and sharply creasing the backing film. There was no adhesive failure between the film and the adhesive.

The product was applied to a smooth decorative surface such as a skate board. The decorative surface was easily visible through the friction surface sheet material. The friction surface sheet material was durable and had a high degree of friction when utilized to cover a skate board.

EXAMPLE 2

The backing film was that described in Example 1. The make and size coatings were the coating composition described below.

| Coating Composition | |
|---|---|
| Ingredients | Parts by Weight |
| Urethane diacrylate oligomer made from hydroxy terminated polyester sold under the trade designation "Lexorez" 1400-120 by the Inolex Corporation and isophoronediisocyanate sufficient to yield isocyanate terminated prepolymer which is then reacted with hydroxyethylmethacrylate | 60.0 |
| N-butylcarbamoylmethacrylate | 20.0 |
| Hexanediol diacrylate | 10.0 |
| Diethoxyacetophenone | 1.0 |

This 100% solids coating composition was cured using a 100 watt per lineal inch ultraviolet light source spaced 65 mm from the web surface at a film speed of 7.6 meters per minute after drop coating the glass particles as described in Example 1.

The resultant friction surface sheet material marginally passed the crease test described above with acceptable slight cracking and minor adhesive failure.

The friction surface sheet material had previously been primed and was coated with primer and pressure-sensitive adhesive as described in Example 1. The resultant product provided an adequate friction surface material which was transparent in use.

EXAMPLE 3

A friction surface sheet material was prepared using the backing described in Example 1, the coating composition described in Example 2 as make coating and glass particles consisting of Wausau #1 quartz particles. Such glass particles had a particle size which passed through 35 Tyler mesh screen and were retained on 170 Tyler mesh screen. The glass particle coating weight was 250 grams per square meter. The make adhesive coating was cured using an electron beam energy source by passing the web at a rate of 15 meters per minute with an energy level of 3 Megarads.

The resultant friction surface sheet material passed the crease test with slight cracking and minor adhesive failure. The product appeared to be quite acceptable in pedestrian areas which had bare foot traffic.

EXAMPLE 4

The backing sheet was the same as that described in Example 1 and the make and size adhesive consisted of the acrylic coating composition described below.

Acrylic Coating Composition

Acrylic polymer solution having an intrinsic viscosity of 0.70 and a Brookfield viscosity of 30,000 cps at 23° C. using a No. 4 spindle at 12 rpm and consisting of
A. 41.0 parts acrylic polymer (I.V. 0.70) made from:
  (1) 52.7 parts by weight methyl methacrylate,
  (2) 43.0 parts by weight ethyl acrylate and
  (3) 4.5 parts by weight isooctoacrylate
B. 59.0 parts xylene The coating composition was applied using an extrusion die to form a film of the composition having a slotted extrusion orifice and permitting the extruded film to fall on the surface of the backing to form a dry coating weight of acrylic coating composition of 105 grams per square meter. Solid glass beads were drop coated on the freshly coated backing at a rate of 250 grams per square meter. The glass beads had a diameter which permitted them to pass through a 20 Tyler mesh screen and to be retained on a 28 Tyler mesh screen. The coating composition was cured in a hot air oven at 105° C. for one hour. The particle coated web was then size coated with the same coating composition to provide a dry coating weight of 105 grams per square meter and curing the size coating as described above for the make coating.

EXAMPLE 5

The primed backing film described in Example 1 was coated with a make coating using a knife coater, the make coating being described below.

| Coating Composition | |
|---|---|
| Ingredients | Parts by Weight |
| Polyisocyanate solution - 75% solids polyisocyanate in "Cellosolve" acetate available under the trade designation "Desmodur" N-751 from the Mobay Chemical Company | 37.22 |
| Hydroxy terminated polyester having a hydroxyl number of 117 available from the Mobay Chemical Company under the trade designation "Desmophene" 670 | 54.90 |
| Ethyl glycol acetate sold under the trade designation "Cellosolve" acetate | 7.25 |
| Ultraviolet stabilizer available from Ciba-Geigy Corporation under the trade designation "Tinuvin" 770 | 0.42 |
| Ultraviolet stabilizer available from the Ciba-Geigy Corporation under the trade designation "Irganox" 1010 | 0.21 |

The make coating was applied at a rate of 125 grams (dry) per square meter and the web was then coated with 165 grams per square meter of the glass particles described in Example 1, except the glass particles were of a size which passed through a 35 Tyler mesh screen and were retained on a 42 Tyler mesh screen. The make coating binder was cured for five minutes at 120° C. in a forced air oven. The particle-coated web was then size coated with the same coating composition using a roll coater to provide a 125 grams per square meter coating which was cured for four hours at 110° C.

EXAMPLE 6

The primed polyester film of Example 1 was knife coated with a coating composition described below to provide 105 grams (dry) per square meter.

| Ingredients | Parts by Weight |
|---|---|
| Isocyanate terminated polymer sold under the trade designation "Adiprene" LW-570 by the DuPont Company | 49.88 |
| 1,4-butanediol | 3.10 |
| Trimethylolpropane | 0.75 |
| Stannous octate | 0.01 |
| "Cellosolve" acetate | 7.12 |

The glass particles, the same as those described in Example 1, were drop coated at a rate of 250 grams per square meter. The make coating was then cured for four hours at 110° C. in a hot air oven. The size coating of the same coating composition was applied by roll coating at a rate of 105 grams (dry) per square meter and then cured for four hours at 110° C.

EXAMPLE 7

The primed polyester film of Example 1 was printed with alternating yellow and black stripes on primed top surface by the Flexographic method using a nitrocellulose base printing ink available under the trade designation "Gemglo" from the Inmat Corporation. The printed film was then processed exactly as described in Example 2 to obtain a friction-surface sheet material which performed substantially like that of Example 2. The stripe pattern was quite visible.

EXAMPLE 8

The printed film of Example 7 was coated with the make and size binders, pressure-sensitive adhesive and glass particles described in Example 1 to produce a useful friction surface sheet material.

EXAMPLE 9

The same as Example 2 except the transparent pressure-sensitive adhesive consisted of the following composition:

| Pressure-Sensitive Adhesive Composition | |
|---|---|
| Ingredients | Parts by Weight |
| Block copolymer of styrene and isoprene sold under the trade designation "Solprene" 423 by the Phillips Petroleum Company | 100 |
| Polymerized limonene tackifier sold under the trade designation "Zonarez" 7125 by the Arizona Chemical Corporation | 75 |
| Antioxidant sold under the trade designation "Cyanox" LTDP by the American Cyanamid | 1.5 |
| Antioxidant sold under the trade designation "Irganox" 1076 by the Ciba Geigy Company | 1.5 |

The pressure-sensitive adhesive was applied at a coating weight of 125 grams per square meter by extrusion coating a 100% solids hot melt.

Each of the binder materials described in Examples 1-2 and 4-6 was evaluated to determine their tensile strength at break and elongation at break using an Instron tensile testing machine. Results are set forth below.

TABLE

| Example | Tensile (psi) | Elongation (%) |
|---|---|---|
| 1 | 1200 | 118 |
| 2 | 1633 | 40 |
| 4 | 1866 | 70 |
| 5 | 2160 | 115 |
| 6 | 4500 | 270 |

What is claimed is:

1. A friction surface sheet material capable of being adherently attached to the surface of a substrate of the type which may have an ornamental pattern on said surface and which sheet material, when attached to said surface, permits visual observation of said pattern therethrough, said sheet material comprising:
   (1) a transparent backing layer formed of a dimensionally stable, biaxially oriented, transparent polymeric film having an upper and a lower major surface;
   (2) a first coating of a first tough transparent binder material having an elongation of at least 40% and a tensile strength of at least 1000 psi adherently bonded to said upper major surface;
   (3) a second coating of a second tough transparent binder material useful for pedestrian traffic and having an elongation of at least 40% and a tensile strength of at least 1000 psi adherently bonded to the exposed surface of said first coating of said first transparent binder material;
   (4) a multitude of minute transparent glass particles no larger than 10 Tyler mesh and capable of withstanding pedestrian traffic without significant fracture uniformly distributed over said upper major surface and firmly adherently bonded thereto by said first and said second transparent binder materials with a combined thickness of said binder materials which is sufficient to substantially prevent particle loss under pedestrian use, with the tops of said glass particles projecting above the exposed surface of said second coating to provide a friction surface; and
   (5) a layer of transparent pressure-sensitive adhesive material over the bottom surface of said backing layer to facilitate attachment of said friction surface material to a substrate.

2. The friction surface sheet material of claim 1 wherein said polymeric film backing layer is provided by a film selected from the group consisting of polyethylene terephthalate film and polypropylene film.

3. The friction surface sheet material of claim 1 wherein said glass particles are fractured glass particles having irregular edges.

4. The friction surface sheet material of claim 1 wherein said glass particles are solid glass beads having spherical shapes.

5. The friction surface sheet material of claim 1 wherein said backing layer has a thickness on the order of 50-80 microns.

6. The friction surface sheet material of claim 1 wherein said first coating of said first transparent binder material is coated on the order of 85-125 grams per square meter.

7. The friction surface sheet material of claim 1 wherein said second coating of transparent binder material is coated in the range of 65 to 145 grams per square meter.

8. The friction surface sheet material of claim 1 wherein said first binder material is a polyurethane binder.

9. The friction surface sheet material of claim 1 wherein said first and said second binder materials are formed of the same material.

10. The friction surface sheet material of claim 1 wherein said second binder material is polyurethane.

11. The friction surface sheet material of claim 1 wherein said pressure-sensitive adhesive is a copolymer of isoocytalacrylate and acrylic acid.

12. The friction surface sheet material of claim 1 wherein the surface of said backing layer is first printed with an image pattern.

13. The friction surface sheet material of claim 12 wherein said printing is provided by a pigmented nitrocellulose printing ink.

* * * * *